United States Patent
Schaffer et al.

(10) Patent No.: US 11,429,758 B1
(45) Date of Patent: Aug. 30, 2022

(54) AUTOMATIC CREATION OF MODELS OF OVERHEAD LINE STRUCTURES

(71) Applicant: Bentley Systems, Incorporated, Exton, PA (US)

(72) Inventors: Denis J. Schaffer, Huntsville, AL (US); Kivanc Karakas, Horsham (GB)

(73) Assignee: Bentley Systems, Incorporated, Exton, PA (US)

( * ) Notice: Subject to any disclaimer, the term of this patent is extended or adjusted under 35 U.S.C. 154(b) by 0 days.

(21) Appl. No.: 17/015,723

(22) Filed: Sep. 9, 2020

Related U.S. Application Data

(60) Provisional application No. 63/046,890, filed on Jul. 1, 2020.

(51) Int. Cl.
| | |
|---|---|
| *G06F 30/10* | (2020.01) |
| *G06T 17/00* | (2006.01) |
| *G06T 11/20* | (2006.01) |
| *B61C 3/00* | (2006.01) |
| *B60M 1/23* | (2006.01) |

(52) U.S. Cl.
CPC ............... *G06F 30/10* (2020.01); *B60M 1/23* (2013.01); *B61C 3/00* (2013.01); *G06T 11/206* (2013.01); *G06T 17/00* (2013.01); *G06T 2200/24* (2013.01); *G06T 2210/36* (2013.01)

(58) Field of Classification Search
CPC .. G06F 30/10; B60M 1/23; B61C 3/00; G06T 11/206; G06T 17/00; G06T 2200/24; G06T 2210/36; G06T 17/05
See application file for complete search history.

(56) References Cited

U.S. PATENT DOCUMENTS

2019/0204105 A1* 7/2019 Milstein ................ G01C 21/32

OTHER PUBLICATIONS

NPL Video Titled "Overheadline Electrification", published Jul. 11, 2017, Available at: https://www.youtube.com/watch?v=ycCEkVFyu84; select screenshots included. (Year: 2017).*
Berthold, N. "The object-oriented design of overhead contact line systems for railway and tram systems." WIT Transactions on the Built Environment 135 (2014): 497-508. (Year: 2014).*

(Continued)

*Primary Examiner* — Daniel F Hajnik
(74) *Attorney, Agent, or Firm* — Cesari and McKenna, LLP; James A. Blanchette

(57) ABSTRACT

In one or more embodiments, techniques are provided for modeling overhead line structures of electric railways that utilize a flexible, reusable structure template to automatically generate a 3D model of the overhead line structure. Each structure template includes a set of points that represent joints of the overhead line structure and components that represent elements of the overhead line structure. A feature definition of each joint and component includes properties, constraints and cell mappings. By mapping key points of reference lines for an overhead line structure to key points in an applicable structure templet for the overhead line structure, and applying the constraints and, in some cases the cell mappings, a 3D model of the overhead line structure is automatically generated. The 3D model may be a "low detail" stick representation for fast modeling, or, using the cell mappings, a "high detail" cell-based representation for very realistic modeling.

20 Claims, 11 Drawing Sheets

(56) References Cited

OTHER PUBLICATIONS

Ding, L. Y., et al. "Using nD technology to develop an integrated construction management system for city rail transit construction." Automation in Construction 21 (2012): 64-73. (Year: 2012).*

Xikui, L. V., Wang Mingsheng, and He Bin. "The research of modeling method of railway 3D landscape." International Journal of Hybrid Information Technology 7.3 (2014): 187-198. (Year: 2014).*

NPL Video titled "Tutorial on Modeling an OHE ( Overhead Equipment) in railways in 3d using 3dsmax", published May 4, 2019, available at: https://www.youtube.com/watch?v=BkzrZzNH_VA; select screenshots included. (Year: 2019).*

Baxter, Alan, "Network Rail: A Guide to Overhead Electrification," Alan Baxter & Associates LLP, 132787-ALB-GUN-EOH-000001, Rev. 10, Feb. 2015, pp. 1-56.

Frey, Sheilah, "Railway Electrification Systems & Engineering," White Word Publications, Delhi, India, First Edition, Dec. 31, 2012, pp. 1-145.

"Electric Traction Power,"The Railway Technical Website, Dec. 31, 2019, pp. 1-9.

\* cited by examiner

AUTOMATIC CREATION OF MODELS OF OVERHEAD LINE STRUCTURES

RELATED APPLICATIONS

The present application claims the benefit of U.S. Provisional Patent Application No. 63/046,890 filed on Jul. 1, 2020, the contents of which are incorporated by reference herein in their entirety.

BACKGROUND

Technical Field

The present disclosure relates generally to railway design software, and more specifically to techniques for modeling overhead line structures of electric railways using railway design software.

Background Information

Electrified railways utilize electric locomotives and/or electric multiple units (herein collectively "electric trains") to haul passengers and freight using electricity to provide motive power. A railway electrification system, for example an overhead line electrification (OLE) system (often referred to simply as an "overhead line system"), typically provides the electricity.

FIG. 1 is a diagram of a typical overhead line system 100. In such a system 100, a wirerun 105 carries electrical current and is supported at intervals by OLE structures (often referred to simply as "overhead line structures") 110. The wirerun 105 typically includes multiple wires, such as a contact wire 115, drop wires (often referred to simply as "droppers") 120, and a catenary wire 125. The contact wire 115 is designed to transfer electric current to a current collector of the electric train, such as a pantograph or bow collector that presses against its underside. Current flows through the motive system of the electric train and back through steel wheels of the electric train to one or both of the running rails 130. The return path running rail(s) are coupled periodically to a parallel return wire 135. The return path running rail(s) are at ground potential and therefore not electrically dangerous.

To achieve good high-speed current collection, the contact wire 115 should be kept within defined position limits. This is typically achieved by tensioning the catenary wire 125 and using it to support the contact wire 110 with the droppers 120. The catenary wire 125 is typically supported by overhead line structures 110 at regular intervals, and designed to sag between such points of support. To accommodate this sag while maintaining the contact wire 115 at the defined position, the droppers 120 often have variable length.

Each overhead line structures 110 typically includes a steel or concrete mast 140 mounted to a concrete foundation 145 which often supports an elevated cantilever assembly. A typical cantilever assembly includes is a steel stay pipe 150 and bracket pipe 155 that form a triangular arrangement that supports the catenary wire 125. The stay pipe 150 and bracket pipe 155 may be electrically isolated from the mast 140 by insulators 160. A steel registration arm 165 and steady pipe 170 may be coupled to the bracket pipe 155 and serve to stabilize the contact wire 115.

A typical electrified railway may include about a thousand overhead line structures for every fifty kilometers of track. Various ones of these overhead line structures may differ from each other given the terrain and other constraints. Further, they may differ from overhead line structures in other areas (e.g., due to country-to-country differences) and other systems (e.g., due to different requirements of light rail, high-speed rail, etc.).

A variety of software applications have been developed to assist in the design construction, maintenance, operation and management of railways, including electrified railways. Such existing software applications, however, have not fully met the challenges presented by overhead line structures, resulting in labor intensive and error prone workflows that still yield limited results. In a common industry workflow using existing software applications, engineers first perform spreadsheet based location design for overhead line structures. The engineers typically use a spreadsheet application to perform the necessary geometrical calculations, and produce numeric results. The numeric results are then provided to a draftsman who uses a computer aided design (CAD) application to manually, or with the assistance of custom macros, create a two-dimensional (2D) OLE layout showing the placement of overhead line structures. Thereafter, a draftsman may manually create 2D overhead line structure cross sections (commonly referred to as structural erection diagrams (SEDs)) for each of the overhead line structure. The draftsman may refer to the 2D OLE layout, but the creation of these SEDs is largely an independent manual process.

FIG. 2 is an example 2D SED 200. Since there are often thousands of overhead line structures in a given project, thousands of SEDs are typically created one-by-one. This is generally extremely labor intensive and may take weeks. It further can be error prone, as it relies heavily on manual operations.

Further, the end deliverable (i.e. a set of 2D cross sections (e.g., SEDs) is limiting. There is an increase desire to use Building Information Modeling (BIM) to provide advanced construction, maintenance, operation and management functionality. However, BIM applications typically require 3D models of structures, not 2D cross sections. While one could manually create 3D models for each overhead line structure, since there are often thousands of overhead line structures in a given project, thousands of 3D models would need to be created one-by-one. This process is generally impractical to be performed manual given the amount of time and resources it would consume.

Accordingly, there is a need for improved techniques for modeling overhead line structures of electric railways that may address some or all of these shortcomings.

SUMMARY

In various embodiments, techniques are provided for modeling overhead line structures of electric railways that utilize a flexible, reusable structure template to automatically generate a 3D model of the overhead line structure. Each structure template includes a set of points that represent joints of the overhead line structure and components that represent elements of the overhead line structure. A feature definition of each joint and component includes properties, constraints and, in some cases, cell mappings. By mapping key points of reference lines for an overhead line structure to key points in an applicable structure template for the overhead line structure, and applying the constraints and, in some cases the cell mappings, a 3D model of the overhead line structure is automatically generated. The 3D model may be a "low detail" stick representation for fast modeling, or, using the cell mappings, a "high detail" cell-based representation for very realistic modeling. The techniques permit rapid creation of 3D models of overhead line structures, reducing some workflows that once would take weeks to minutes, while minimizing sources of potential human error. The techniques also provide a deliverable (i.e. 3D models) that was not previously practical to produce, enabling use of BIM applications that require 3D models. In this way, advanced construction, maintenance, operation and management functionality may be unlocked.

In one example embodiment, a method for modeling overhead line structures of electric railways is provided. Rail network design software identifies a reference line for an overhead line structure in a rail network model. The reference line has one or more key points. The rail network design software accesses a structure template associated with the overhead line structure, and then matches each key point of the reference line with a corresponding key point of the structure template and adjusts coordinates of the corresponding key point of the structure template to coincide with the key point of the reference line. The rail network design software updates coordinates of one or more additional points (regular points) of the structure template based on the adjusted coordinates of the one or more key points of the structure template and one or more constraints of the structure template. Based on the coordinates of each key point and additional points of the structure template, the software automatically generates a 3D model of the overhead line structure, that may be displayed or otherwise utilized.

It should be understood that a variety of additional features and alternative embodiments may be implemented other than those discussed in this Summary. This Summary is intended simply as a brief introduction to the reader for the further description that follows, and does not indicate or imply that the examples mentioned herein cover all aspects of the disclosure, or are necessary or essential aspects of the disclosure.

BRIEF DESCRIPTION OF THE DRAWINGS

The description refers to the accompanying drawings of example embodiments, of which.

DETAILED DESCRIPTION

Definitions

As used herein, the term "overhead line system" refers to a system of wires, insulators and supporting overhead line structures used to transfer electrical power to an electric train.

As used herein, the term "wirerun" refers to a set of one or more wires used to carry electrical current. For example, a wirerun may include a contact wire, droppers, and a catenary wire.

As used herein, the "overhead line electrification (OLE) structure", or simply "overhead line structure", refers to an assembly designed to support one or more wireruns at predetermined location(s) relative to rails of a railway.

As used herein, the term "reference line" refers to a representation showing the placement of an overhead line structure, including its foundation location and its orientation relative to wireruns.

As used herein, the term "structure template" refers to a generic representation of a type of overhead line structure that includes a set of points that represent joints of the overhead line structure and components that represent elements of the overhead line structure.

As used herein, the term "level of detail 200", or simply "LOD 200", refers to a representation where at least some elements are only approximately modeled with at least some quantities, sizes, shapes, locations and orientations roughly estimated.

As used herein, the term "level of detail 400", or simply "LOD 400", refers to a representation where elements are modeled as specific assemblies, with complete fabrication, assembly, and detailing information in addition to precise quantity, size, shape, location and orientation.

As used herein, the term "stick representation" refers to a 3D model of a structure that simplifies the structure to a plurality of line segments arranged in 3D space. Stick representations are typically "low detail" models, e.g., LOD 200 models.

As used herein, the term "cell" refers to a set of graphical solids that describe a structure. For example, a cell typically is stored in a library and may be reused repeatedly.

As used herein, the term "static cell" refers to a type of cell having fixed dimensions that cannot be adjusted at placement time.

As used herein, the term "parametric cell" refers to a type of cell having dimensions that can be adjusted at placement time to change visual appearance of the cell. For example, a parametric cell that represents a pipe may have dimensions of length, diameter and wall thickness that can be adjusted at placement time to change visual appearance of the pipe.

As used herein, the term "cell-based representation" refers to a 3D model of a structure that uses a plurality of graphical solids arranged in 3D space. Cell-based representations are typically "high detail" models, e.g., LOD 400 models.

EXAMPLE EMBODIMENTS

Figure 1:
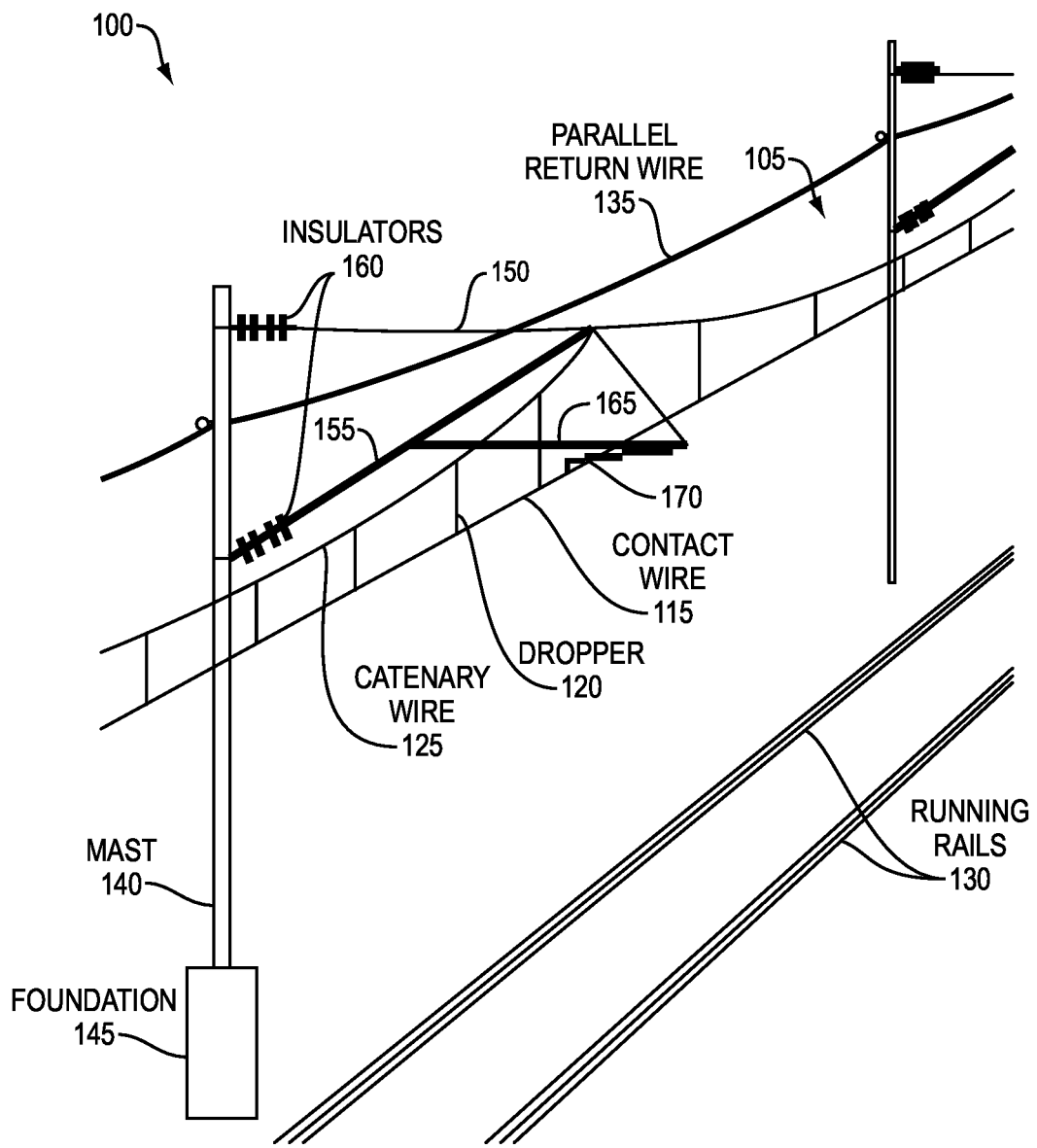
FIG. 1 is a diagram of a typical overhead line system.
Figure 2:
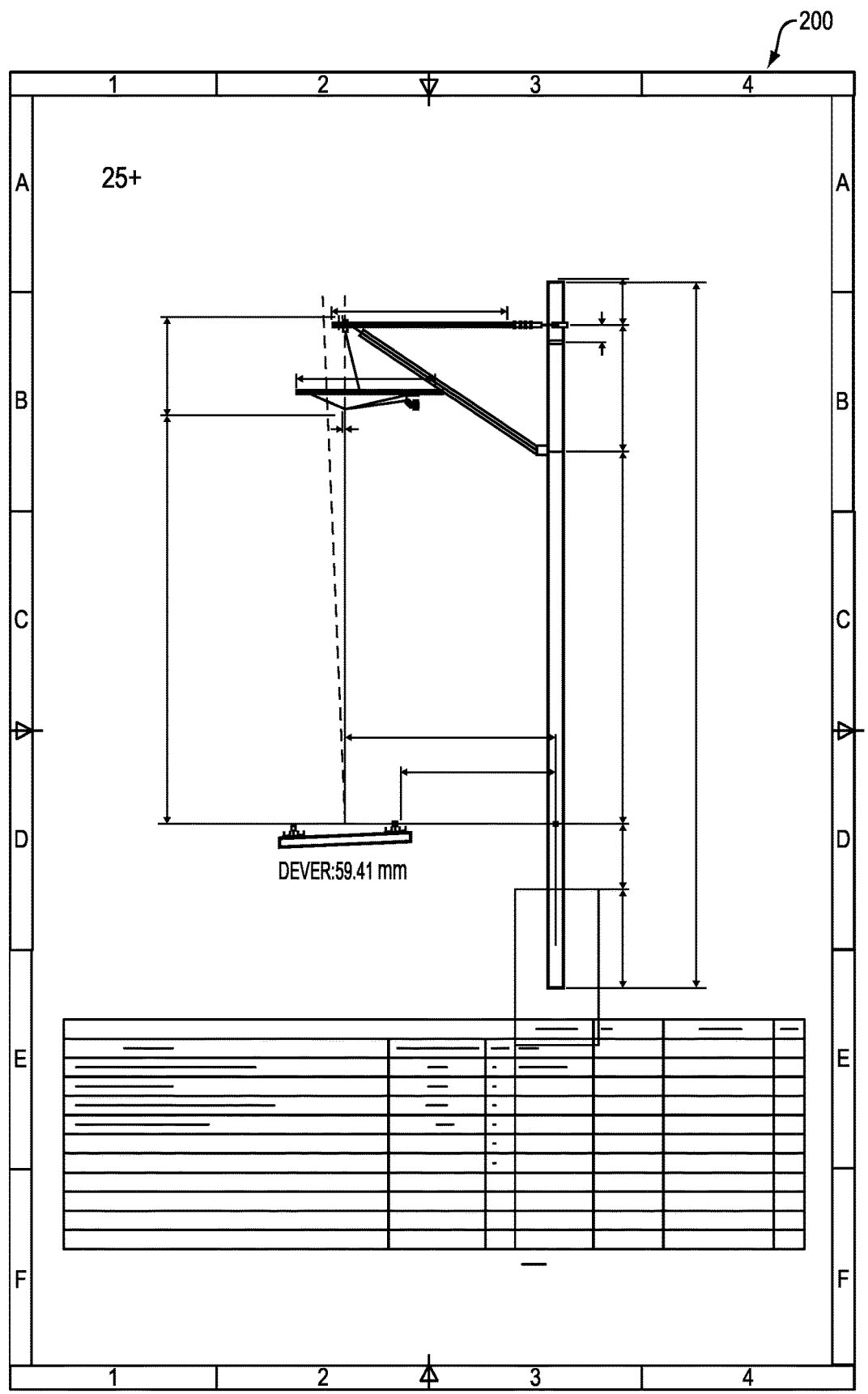
FIG. 2 is an example 2D SED.
Figure 3:
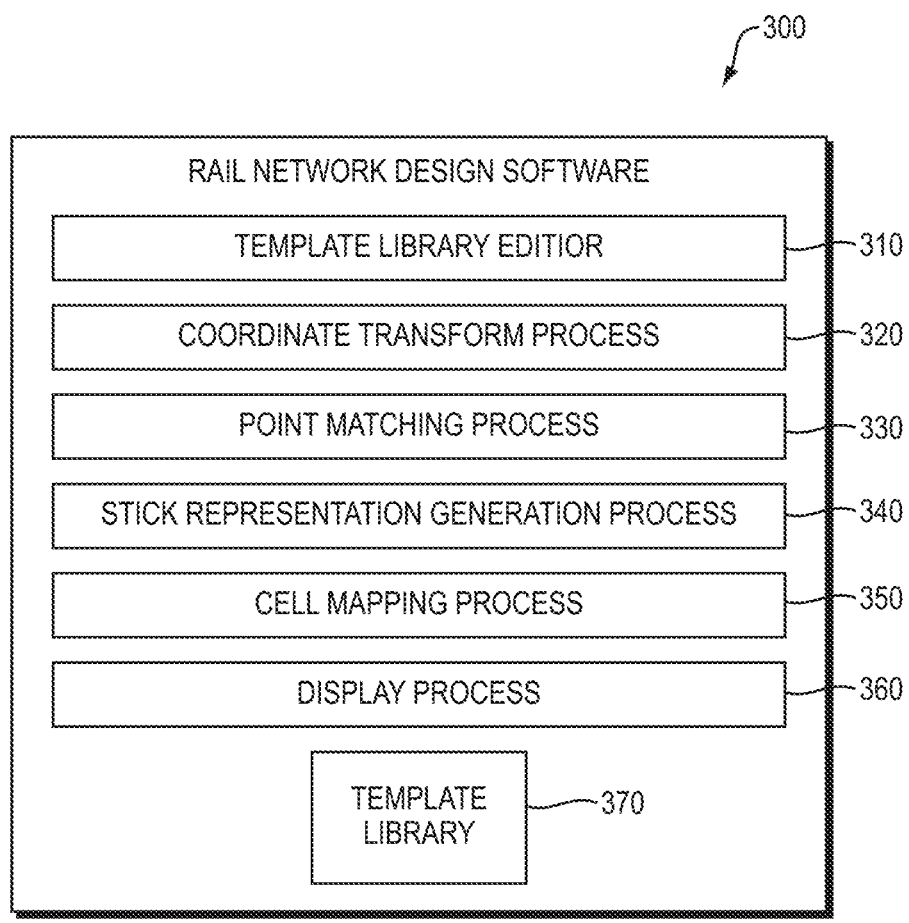
FIG. 3 is high-level block diagram showing portions of rail network design software.

FIG. 3 is high-level block diagram showing portions of rail network design software 300. In one embodiment, the rail network design software 300 is the OpenRail™ rail network design software available from Bentley Systems, Incorporated, however it should be understood that the software may take other forms. The rail network design software 300 is executed on one or more electronic devices (e.g., computers) that each may include processors, memory, storage devices, display devices (e.g., display screens) and/or other hardware. In some implementations, one or more of the electronic devices may be locally disposed, and one or more of the electronic devices may be located in the cloud. For example, the rail network design software 300 may utilize a connected data environment (CDE) executing on electronic devices in the cloud that provides a framework for collaboration and central data management, and local clients executing on local electronic devices that provide user interfaces, modeling tools, and other functionality. The network design software 300 may include a template library editor 310, a coordinate transform process 320, a point matching process 330, a stick representation generation process 340, a cell mapping process 350, a display process 360, as well as a number of other software modules and logical processes. The rail network design software 300 may be used to generate templates of overhead line structures that are maintained in a template library 370.

Figure 4:
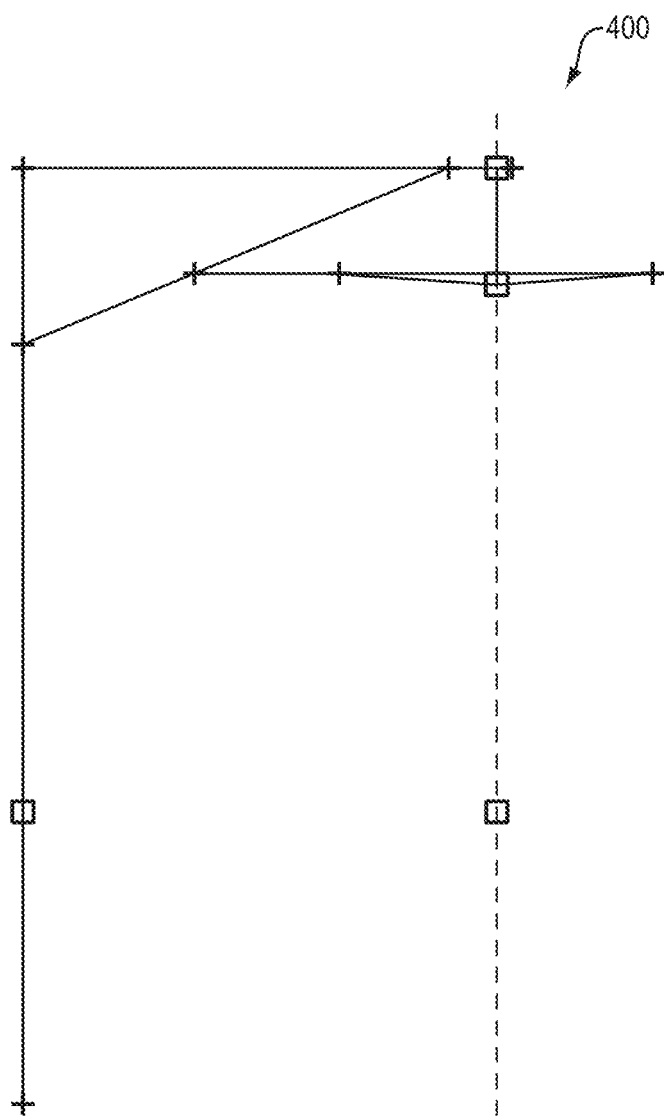
FIG. 4 is a visualization of an example structure template for a particular type of overhead line structure of an electric railway.

FIG. 4 is a visualization of an example structure template 400 for a particular type of overhead line structure of an electric railway. While a single example structure templates 400 is discussed here, it should be understood that the template library 370 will typically include a number of different structure templates for various overhead line structures used by different types of rail (e.g., light rail, high speed rail, etc.), in different countries, and suited for different environments (e.g., terrain, surroundings, etc.). Each structure template includes a set of points that represent joints of the overhead line structure and components that represent elements (e.g., that represent concrete posts, steel pipes, I-beams, channel shapes, angle shapes, insulators, wires, etc.) of the overhead line structure. For instance, the example structure templates 400 includes points and components connecting those points illustrated by lines.

Each point and component of a structure template has a feature definition that may include properties, constraints and, in some cases, cell mappings. The properties may indicate type (e.g., regular point or key point for a point), size (depth, diameter, length etc. for a component) or other information. For example, in FIG. 4 the properties may indicate some points are key points, such as foundation points representing the foundation of the overhead line structure, the contact point where the overhead line structure touches the contact wire and the catenary point where the overhead line structure touches the catenary wire. Likewise, the properties may indicate some points are regular points. The constraints may indicate relationships (e.g., within a plane extending vertically through the overhead line structure's foundation). For example, one point may be constrained to one or more other points to maintain horizontal, vertical or absolute distances, slopes, vectors or more complex relationships. Dimensions of components may be constrained based on (e.g., to match) the points they extend between. The cell mappings may indicate mappings of components and points to cells of a cell library. Components are generally mapped to a type of cell while points are generally mapped to properties of that type of cell (e.g., its origin point, rotation, length, etc.).

Figure 5:
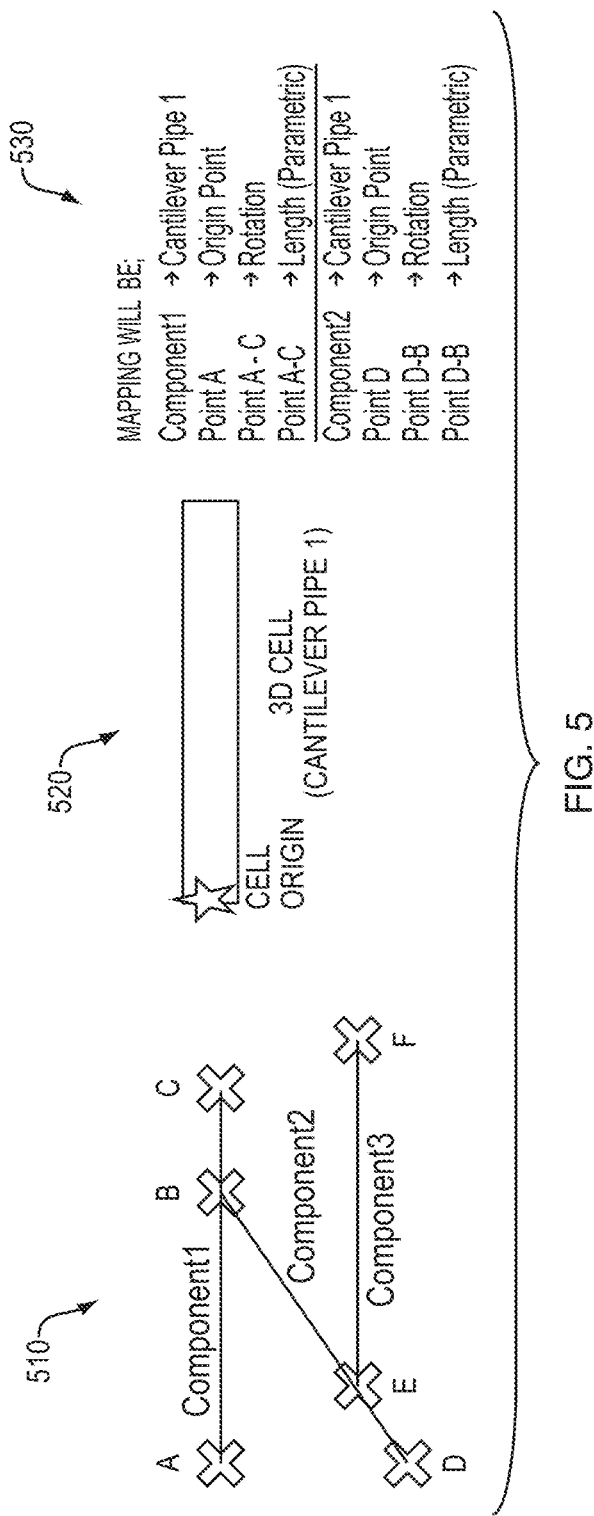
FIG. 5 is a series of diagrams illustrating an example of cell mappings.

FIG. 5 is a series of diagrams 500 illustrating an example of cell mappings. The left-hand diagram 510 shows an example cantilever assembly of an overhead line structure having Points A-F and Components 1-3. The center diagram 520 shows an example parametric cell representing a cantilever pipe (Cantilever Pipe 1) that may be used to model Component 1 and Component 2. The right-hand diagram 530 shows an example cell mapping that may be maintained in a structure template that maps components to types of cells and points to properties of that type of cell. In this example, the cell mapping maps Component 1 to the Cantilever Pipe 1 cell, Point A to the origin point of the Cantilever Pipe 1 cell, Point B to the rotation of the Cantilever Pipe 1 cell and Point C to the length of the Cantilever Pipe 1 cell, taking advantage of its parametric nature.

Figure 6A:
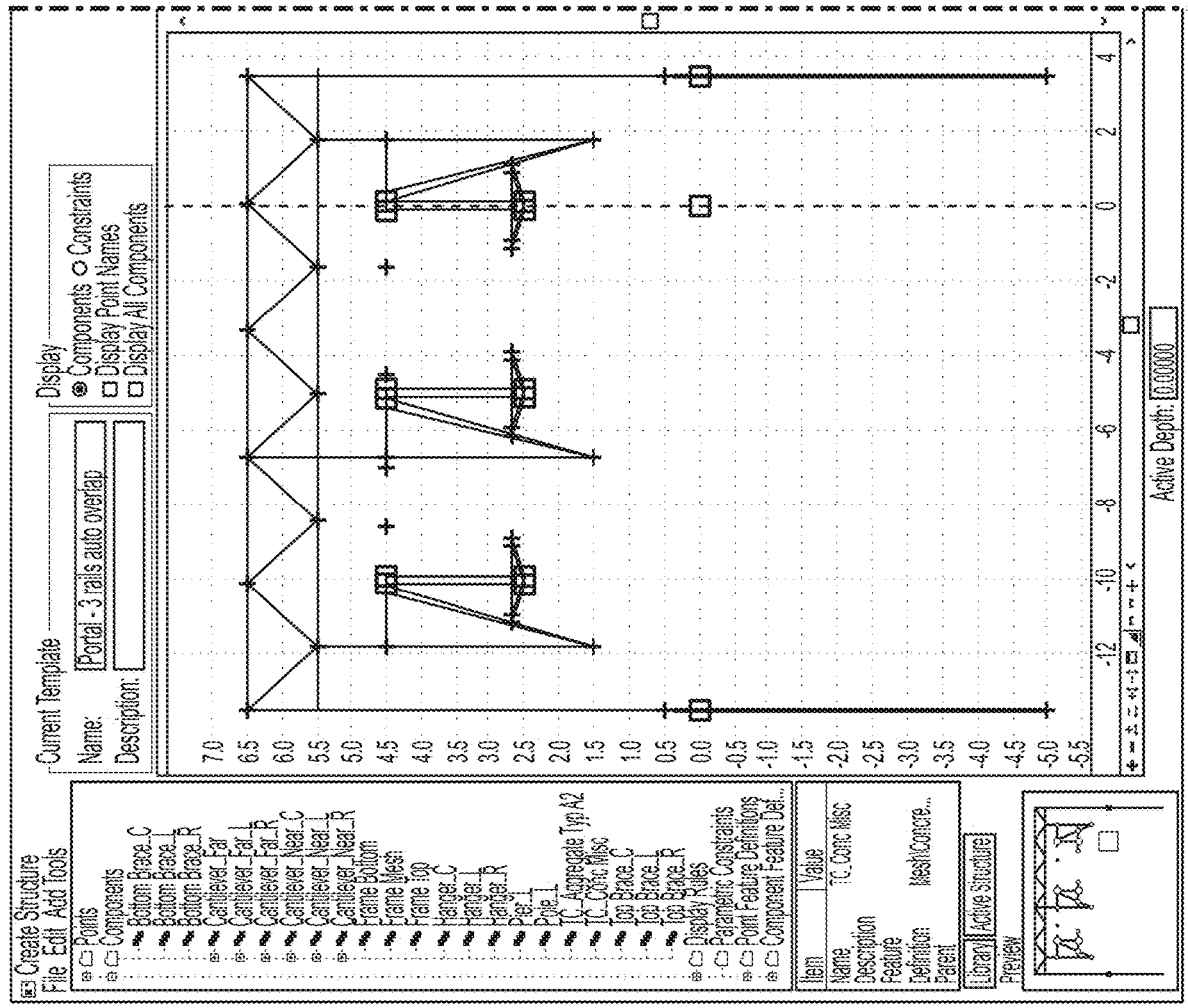
FIGS. 6A and 6B collectively are a screen shot of an example template library editor using which structure templates may be defined.
Figure 6B:
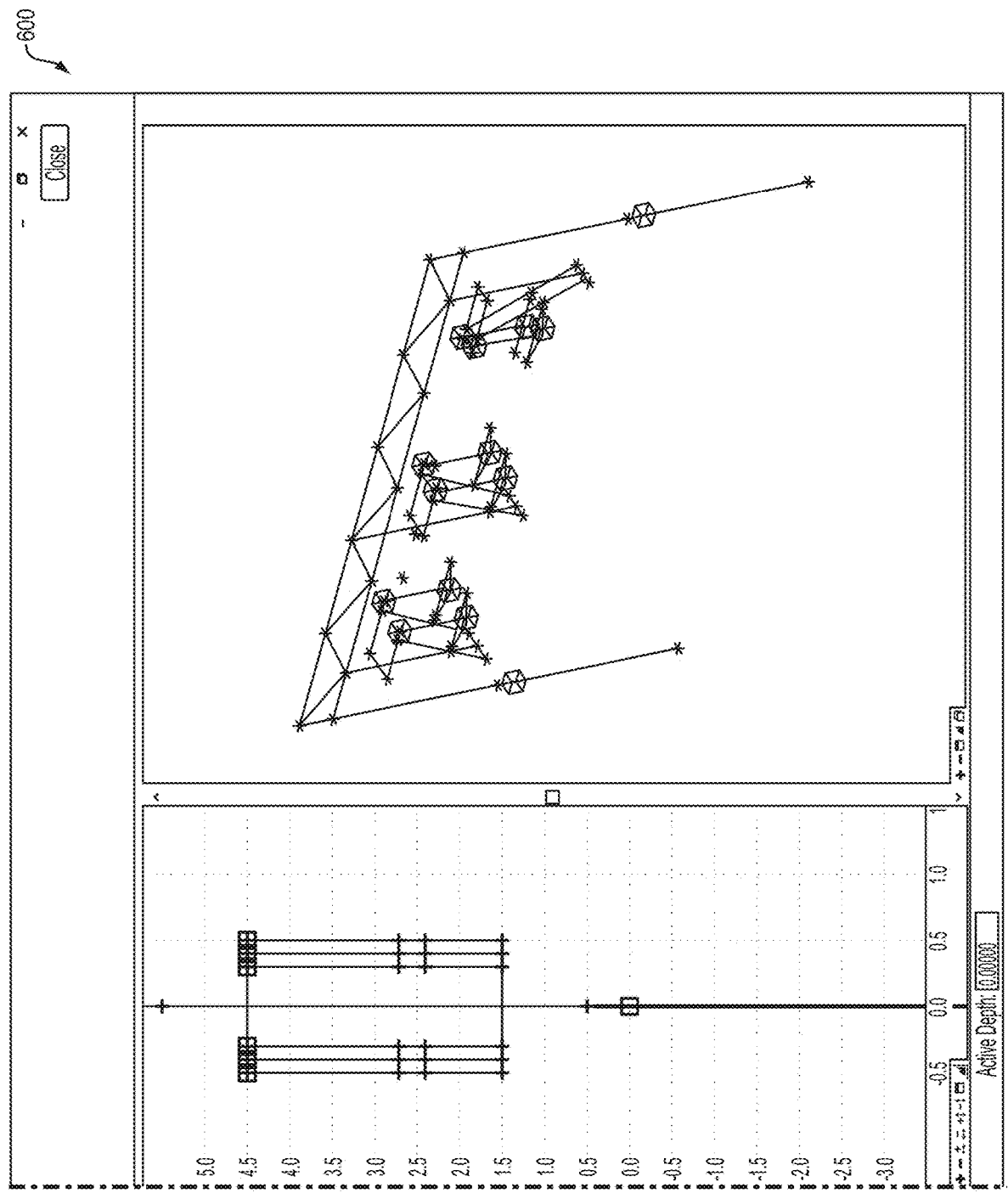

Structure templates, such as the example structure template 400 visualized in FIG. 4, may be created using the template library editor 310 of the rail network design software 300. FIGS. 6A and 6B collectively are a screen shot 600 of an example template library editor 310 using which structure templates may be defined. The template library editor 310 may have a graphical user interface that is divided into multiple portions, for example, three portions showing a cross-section view, a side view and a 3-D view, respectively. As part of defining the structure template, the user may specify constraints (e.g., within a vertical plane), which may include horizontal offset, vertical offset, slope from a point, vector offset (i.e., a vector defined by two points with an offset perpendicular to the vector), angle distance (i.e. an angle based on two points that set a baseline and a distance from one of the two points), a horizontal offset maximum or minimum for two points, a vertical offset maximum or minimum from two points, or other horizontal, vertical or absolute distances, slopes, vectors or more complex relationships. Further, as part of a workplace setup operation the user may specify cell mappings that indicate types of static or parametric cells that should be used to represent components, and how points affect the properties of that type of cell. The user may, for example, select types of cells from different cell libraries to represent different levels of detail, depending on project requirements.

Figure 7:
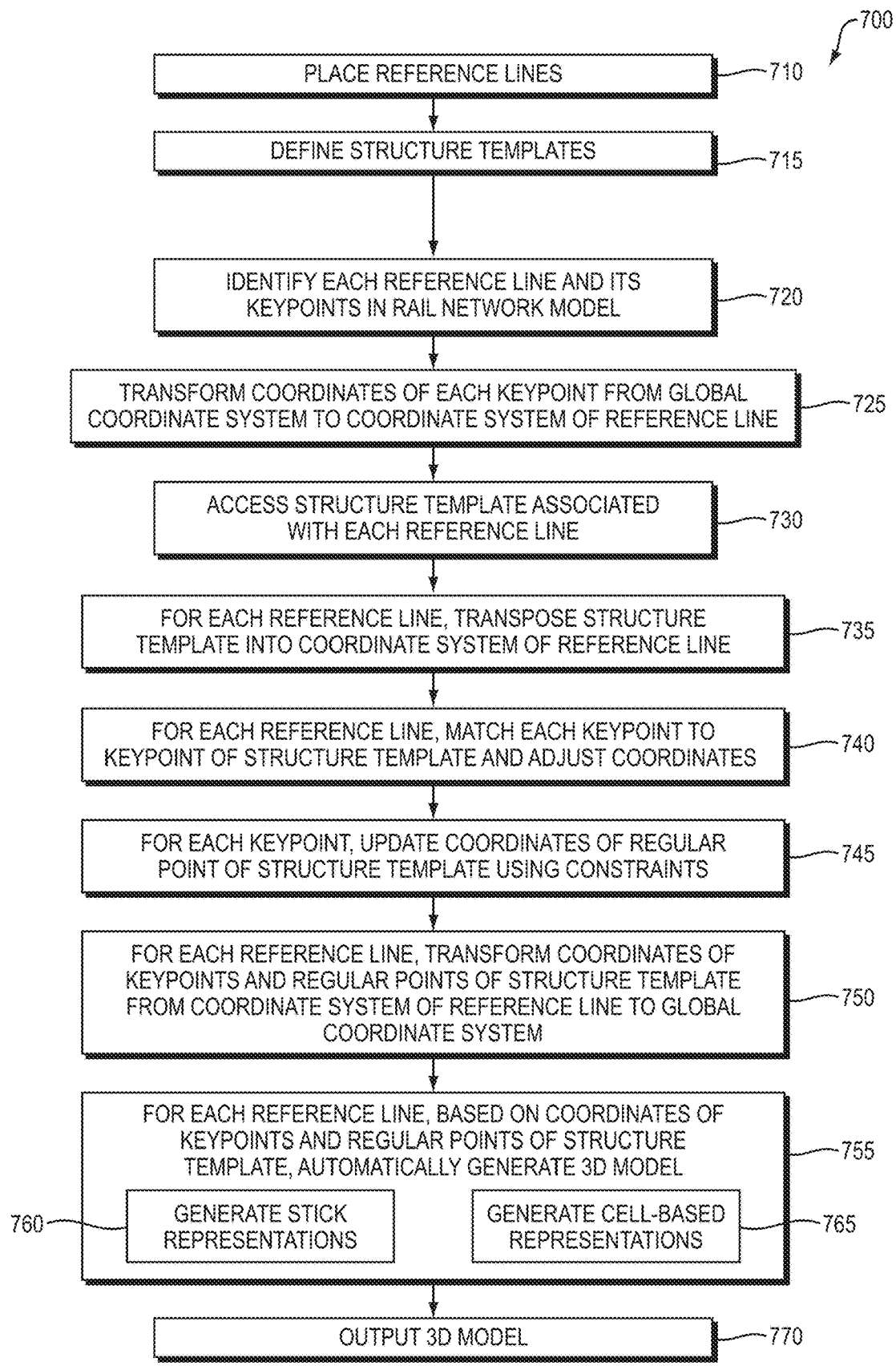
FIG. 7 is a flow diagram of an example sequence of steps for modeling overhead line structures.
Figure 8:
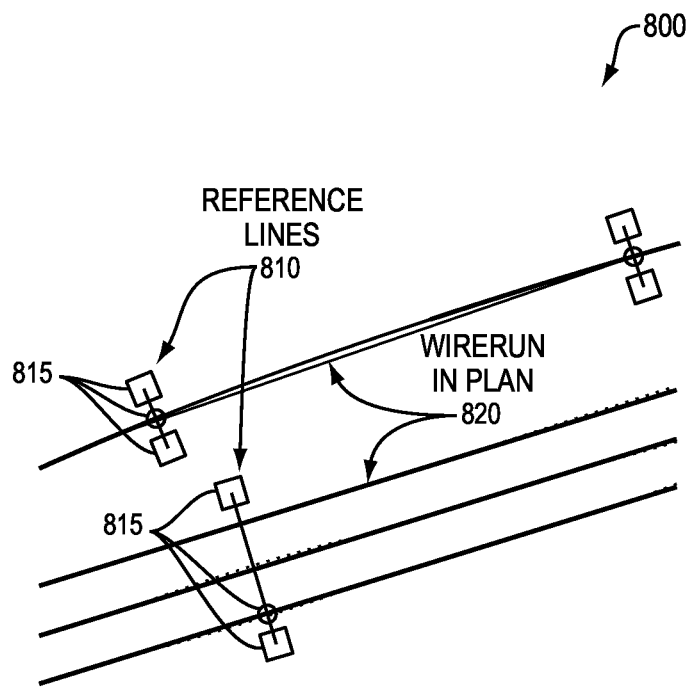
FIG. 8 is a view of an example rail network model showing reference lines with key points placed in relation to wireruns.

FIG. 7 is a flow diagram of an example sequence of steps 700 for modeling overhead line structures. At step 710, which may be part of initial rail network modeling, a user uses the rail network design software 300 to place reference lines and wireruns in relation to rail locations in a rail network model, given support spacing and other requirements. Each reference line includes key points, for example, a foundation point for a foundation of the overhead line structure, a contact point where the overhead line structure touches a contact wire and a catenary point where the overhead line structure touches a catenary wire. FIG. 8 is a view 800 of an example rail network model showing reference lines 810 with key points 815 placed in relation to wireruns 820.

At step 715, which may be part of initial workplace setup for the rail network design software 300, a user uses the template library editor 310 to define structure templates and propagate them into the template library 370. As discussed above, the structure templates include properties, constraints and, in some cases, cell mappings for points and components.

Subsequent to these initial steps, the rail network design software 300 may rapidly create 3D models of overhead line structures in a largely automated manner. At step 720, the rail network design software 300 identifies each reference line and its key points in the rail network model. At step 725, the coordinate transform process 320 of the rail network design software 300 transforms coordinates of each key point of each reference line from a global coordinate system to coordinates of a coordinate system of the reference line, which may be defined in a vertical plane that extends through the reference line. The coordinates in the coordinate system of the reference line may represent relative offset, elevation and depth. At step 730, the rail network design software 300 accesses a structure template from the template library 370 associated with each reference line. The associated structure template may be determined based on a user selection, a property of the reference line, or other indicia of association. At step 735, for each reference line, the coordinate transform process 320 of the rail network design software 300 transposes the associated structure template into the coordinate system of the reference line. In effect, the vertical plane of the structure template is caused to coincide with the vertical plane that extends through the reference line.

Then, at step 740, for each reference line, the point matching process 330 of the rail network design software 300 matches each key point of the reference line with a corresponding key point of the associated structure template and adjusts coordinates of the corresponding key point of the structure template to coincide with the key point of the reference line. For example, foundation points in the structure template are matched with the foundation points of the reference line and then projected onto the surface to provide an elevation. Contact points and catenary points are adjusted to match where the contact wire and catenary wire from each associated wirerun pass through the vertical plane that extends through the reference line.

At step 745, for each reference line, the rail network design software 300 updates coordinates of regular points of the associated structure template based on the adjusted coordinates of key points in the structure template and the constraints defined in the template applicable to them. Thereafter, at step 750, for each reference line, the coordinate transform process 320 of the rail network design software 300 transforms the coordinates of each key point and regular point of the associated structure template from the coordinate system of the reference line back to the global coordinate system of the rail network model.

At step 755, for each reference line, based on the coordinates of each key point and regular point of the associated structure template, the rail network design software 300 automatically generates a 3D model of the overhead line structure in the rail network model. Step 370 may involve the generation of a stick representation and/or a cell-based representation of each overhead line structure. A stick representation and a cell-based representation may be generated sequentially (e.g., a stick representation generated first to provide fast modeling and then, upon demand, converted to a cell-based representation to provide very realistic modeling), or alternatively (e.g., only a stick representation or only a cell-based representation generated), depending upon the implementation.

Figure 9:
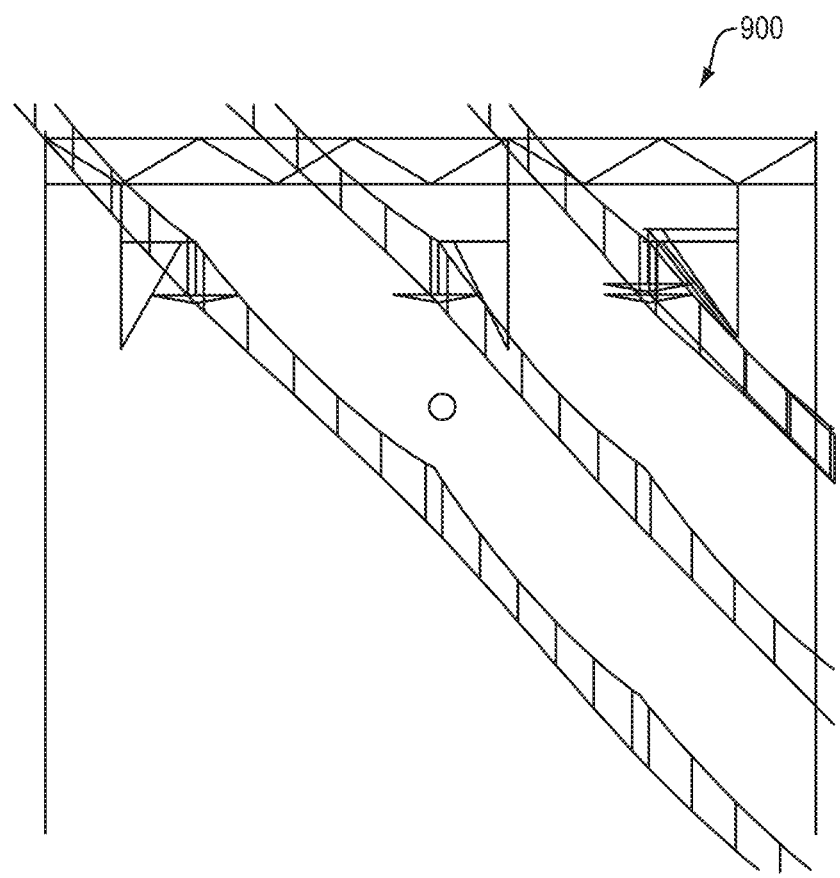
FIG. 9 is an example stick representation of an overhead line structure that may be generated as part of FIG. 7.

At sub-step 760, the stick representation generation process 340 generate a stick representation of each overhead line structure by extending line segments between the coordinates of selected key points and regular points. FIG. 9 is an example stick representation 900 of an overhead line structure that may be generated as part of sub-step 760 of FIG. 7. The stick representation 900 may be a LOD 200 representation. The stick representation of each overhead line structure may be insufficient for some applications, for example some BIM applications. However, the stick representation may be sufficient to generate SEDs with dimensions.

Figure 10:
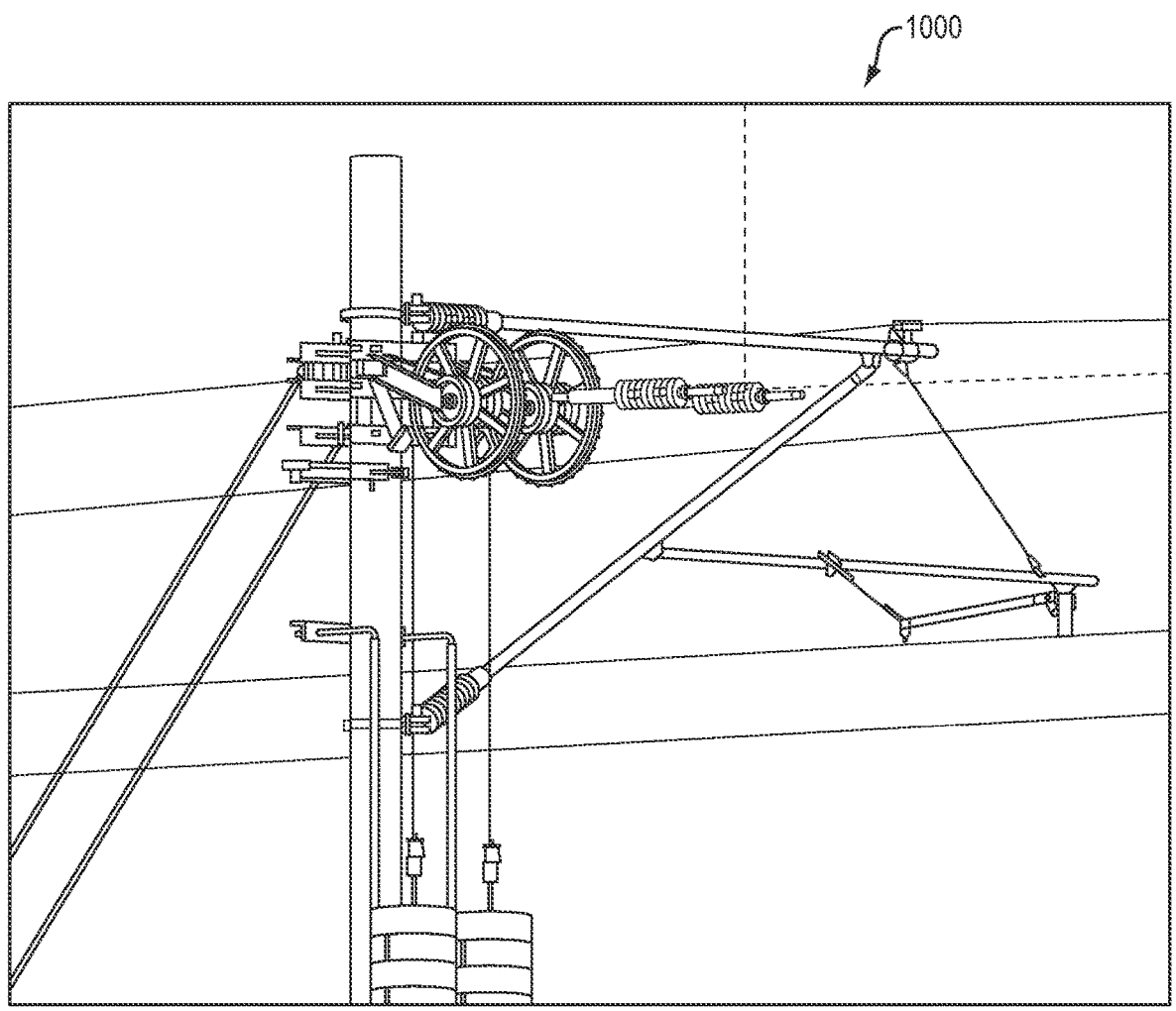
FIG. 10 is a line drawing of an example cell-based representation of an overhead line structure that may be generated as part of FIG. 7.

At sub-step 765, the cell mapping process 350 generates a cell-based representation of each overhead line structure by using the cell mappings in the structure template to map each component to a corresponding cell of the cell-based representation and each point to a property of a corresponding cell. Static components (e.g., wire clamps) may be mapped to static (i.e. non-parametric) cells. Variable components (e.g., pipes of the cantilever assembly) may be mapped to parametric cells whose dimension values are adjusted at placement time. The cell-based representation may be needed for some BIM application involving advanced construction, maintenance, operation and management functionality. FIG. 10 is a line drawing of an example cell-based representation 1000 of an overhead line structure that may be generated as part of sub-step 765 of FIG. 7. The cell-based representation 1000 may be a LOD 400 representation.

At step 770, the 3D model of each overhead line structure (e.g., as a stick representation and/or a cell-based representation) is output. Such output may take a number of different forms. For example, the display process 360 of the rail network design software 300 may displays the 3D model to a user on a display screen. Alternatively, or additionally, the rail network design software 300 may provide the 3D model (e.g., as a stick representation) to an internal or external process that automatically generates SEDs. A step (not shown) of automatically generating a SED therefrom may then be performed subsequent to the steps in FIG. 7. In still another alternative, or additional operation, the rail network design software 300 may provide the 3D model (e.g., as a cell-based representation) to a BIM application for use in advanced construction, maintenance, operation and/or management tasks. A step (not shown) of using the cell-based representation by a BIM application may be performed subsequent to the steps in FIG. 7.

It should be understood that various adaptations and modifications may be readily made to what is described above, to suit various implementations and environments. While it is discussed above that many aspects of the techniques may be implemented by specific software processes executing on certain hardware, it should be understood that some or all of the techniques may also be implemented by different software on different hardware. In addition to general-purpose electronic devices, the hardware may include specially configured logic circuits and/or other types of hardware components. Above all, it should be understood that the above descriptions are meant to be taken only by way of example.

What is claimed is:

1. A method for modeling overhead line structures of electric railways, comprising:

identifying, by rail network design software executing on one or more electronic devices, a reference line for an overhead line structure in a rail network model, the reference line having one or more key points;

accessing a structure template associated with the overhead line structure;

matching each key point of the reference line with a corresponding key point of the structure template, and adjusting coordinates of the corresponding key point of the structure template to coincide with the key point of the reference line;

updating coordinates of one or more additional points of the structure template based on the adjusted coordinates of the one or more key points of the structure template and one or more constraints of the structure template;

based on the coordinates of each key point and additional point of the structure template, automatically generating, by the rail network design software, a three dimensional (3D) model of the overhead line structure; and displaying, on a display screen of the one or more electronic devices, the 3D model of the overhead line structure.

2. The method of claim 1, wherein the 3D model of the overhead line structure is a stick representation.

3. The method of claim 1, wherein the 3D model is a cell-based representation.

4. The method of claim 3, wherein the cell-based representation is a level of detail (LOD) 400 model of the overhead line structure.

5. The method of claim 1, wherein the structure template includes a set of points that represent joints of the overhead line structure and components that represent elements of the overhead line structure, wherein the components extend between points.

6. The method of claim 5, wherein the structure template further includes a feature definition that includes a cell mapping, and the generating further comprises:
using the cell mapping to map each component to a corresponding cell of the cell-based representation and each point to a property of the corresponding cell.

7. The method of claim 6, wherein the cell-based representation includes at least one parametric cell having a dimension value that is adjusted as part of the automatically generating.

8. The method of claim 6, further comprising:
defining the structure template in response to user input to the rail network design software, the defining including building the feature definition of each point; and
maintaining the structure template in a template library.

9. The method of claim 8, wherein the feature definition of each point and component further include properties and constraints.

10. The method of claim 1, further comprising:
transforming coordinates of each key point of the reference line from a global coordinate system to coordinates of a coordinate system of the reference line; and
transposing the structure template into the coordinate system of the reference line.

11. The method of claim 10, further comprising:
transforming the coordinates of each key point and additional point of the structure template from the coordinate system of the reference line back to the global coordinate system.

12. The method of claim 1, wherein the one or more key points of the reference line include a foundation point for a foundation of the overhead line structure, a contact point where the overhead line structure touches a contact wire and a catenary point where the overhead line structure touches a catenary wire.

13. The method of claim 1, wherein the method further comprises:
generating a structural erection diagram (SED) for the overhead line structure from the 3D model.

14. An electronic device, comprising:
a processor;
a display screen; and
a memory coupled to the processor and configured to store rail network design software and a rail network model that includes a reference line, the rail network design software including:
a template library editor configured to define a structure template that includes a set of points that represent joints of an overhead line structure and components that represent elements of the overhead line structure that extend between points, wherein the structure template includes constraints and cell mappings,
a point matching process configured to match each key point of the reference line to a corresponding key point of the structure template and adjust coordinates of the corresponding key point of the structure template to coincide with the key point of the reference line,
a coordinate transform process configured to update coordinates of one or more additional points of the structure template based on the adjusted coordinates of one or more key points of the structure template and one or more constraints of the structure template,
a cell mapping process configured to map each component to a cell of the cell-based representation and each key point and additional point of the structure template to a property of a cell of the cell-based representation using the cell mappings of the structure template, and
a display process configured to display the cell-based representation of the overhead line structure on the display screen.

15. The electronic device of claim 14, wherein the rail network design software further includes:
a stick representation generation process configured to automatically generate, based on the coordinates of each key point and additional point of the structure template, a stick representation of the overhead line structure,
wherein the display process is further configured to display the stick representation of the overhead line structure on the display screen.

16. A non-transitory electronic-device readable medium having instructions stored thereon, the instructions when executed by one or more electronic devices operable to:
define a structure template that includes a set of points that represent joints of an overhead line structure and components that represent elements of the overhead line structure that extend between points, wherein the structure template includes a feature definition of each point and component that includes constraints;
identify a reference line in a rail network model for an overhead line structure, the reference line having one or more key points;
match each key point of the reference line with a corresponding key point of the structure template and adjust coordinates of points of the structure template based on the match and one or more constraints of the structure template; and
based on the coordinates of each point of the structure template, automatically generate a three dimensional (3D) model of the overhead line structure.

17. The non-transitory electronic-device readable medium of claim 16, wherein the 3D model is a stick representation.

18. The non-transitory electronic-device readable medium of claim 16, wherein the 3D model is a cell-based representation.

19. The non-transitory electronic-device readable medium of claim 18, wherein the feature definition further includes a cell mapping, and the instructions that when executed are operable to automatically generate are further operable to:
use the cell mapping to map each component to a cell of the cell-based representation and each point to a property of a cell of the cell-based representation.

20. The non-transitory electronic-device readable medium of claim 19, wherein the cell-based representation includes at least one parametric cell having a dimension value and the instructions that when executed are operable to automatically generate are further operable to:

adjust the dimension value as part of the automatically generating.

\* \* \* \* \*